(12) United States Patent
Jannot et al.

(10) Patent No.: US 10,033,312 B2
(45) Date of Patent: Jul. 24, 2018

(54) METHOD FOR DETERMINING THE POLARITY OF A ROTOR POLE OF AN ELECTRICAL ROTATING MACHINE

(71) Applicant: MOTEURS LEROY-SOMER, Angouleme (FR)

(72) Inventors: Xavier Jannot, Angouleme (FR); Jacques Saint-Michel, Angouleme (FR); Mathias Tientcheu-Yamdeu, Angouleme (FR)

(73) Assignee: MOTEURS LEROY-SOMER, Angouleme (FR)

( * ) Notice: Subject to any disclaimer, the term of this patent is extended or adjusted under 35 U.S.C. 154(b) by 73 days.

(21) Appl. No.: 15/110,305

(22) PCT Filed: Dec. 19, 2014

(86) PCT No.: PCT/IB2014/067109
§ 371 (c)(1),
(2) Date: Jul. 7, 2016

(87) PCT Pub. No.: WO2015/104609
PCT Pub. Date: Jul. 16, 2015

(65) Prior Publication Data
US 2016/0329845 A1    Nov. 10, 2016

(30) Foreign Application Priority Data
Jan. 7, 2014 (FR) ...................................... 14 50101

(51) Int. Cl.
*H02P 6/18* (2016.01)
*H02K 1/27* (2006.01)
(Continued)

(52) U.S. Cl.
CPC ........... *H02P 6/183* (2013.01); *H02K 1/2766* (2013.01); *H02K 21/14* (2013.01); *H02P 6/182* (2013.01)

(58) Field of Classification Search
CPC . H02P 6/183; H02P 6/182; H02P 6/16; H02K 1/2766; H02K 21/14
(Continued)

(56) References Cited

U.S. PATENT DOCUMENTS 5,608,300 A * 3/1997 Kawabata ........... B60L 11/1807
318/400.16
6,163,127 A * 12/2000 Patel ................... B60L 11/1803
318/700
(Continued)

FOREIGN PATENT DOCUMENTS

WO    2004/023639 A1    3/2004

OTHER PUBLICATIONS

Nov. 17, 2015 International Search Report issued in International Patent Application No. PCT/IB2014/067109.

*Primary Examiner* — Rita Leykin
(74) *Attorney, Agent, or Firm* — Oliff PLC

(57) ABSTRACT

A method for determining the polarity of a pole of a rotor of an electrical rotating machine, having an estimated position in relation to a stator, said method including the following steps: a) applying an excitation voltage to the stator such as to generate two different magnetic fluxes successively inside a saturable magnetic zone of the pole, one flux in conjunction with and the other in opposition to the magnetic flux of the magnets, such as to saturate the saturable magnetic zone for at least one of the magnetic fluxes; and b) determining the polarity of the pole according to the differences in the temporal evolution of the current generated in the stator by the two fluxes.

16 Claims, 6 Drawing Sheets

Figure 1:
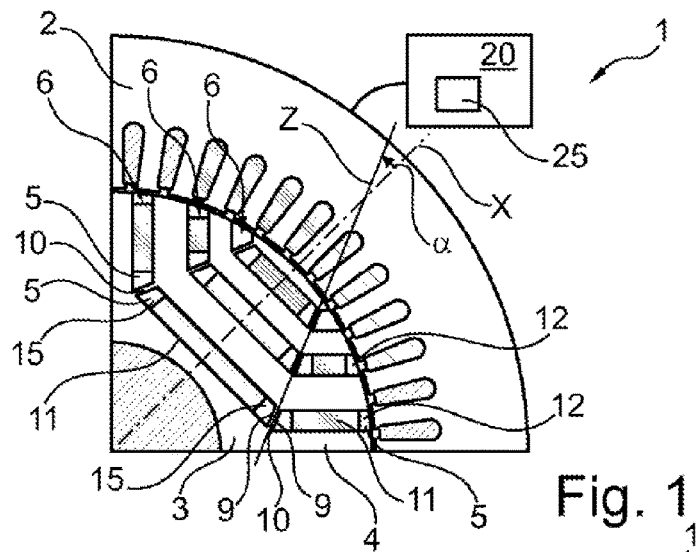

(51) Int. Cl.
   *H02P 6/182* (2016.01)
   *H02K 21/14* (2006.01)
(58) Field of Classification Search
   USPC .......................................... 318/701
   See application file for complete search history.

(56) References Cited

U.S. PATENT DOCUMENTS

| | | | |
|---|---|---|---|
| 6,396,229 B1* | 5/2002 | Sakamoto | H02P 6/18 318/400.02 |
| 7,679,308 B2* | 3/2010 | Tomigashi | H02P 21/14 318/400.02 |
| 7,893,639 B2* | 2/2011 | Tomigashi | H02P 6/18 318/400.21 |
| 7,893,649 B2* | 2/2011 | Lamprecht | H02P 6/185 318/720 |
| 8,384,323 B2* | 2/2013 | Akiyama | H02P 6/18 318/400.02 |
| 8,829,830 B2* | 9/2014 | Kobayashi | H02P 21/141 318/400.01 |
| 2004/0070362 A1* | 4/2004 | Patel | H02P 21/00 318/701 |
| 2007/0040528 A1* | 2/2007 | Tomigashi | H02P 21/22 318/650 |
| 2007/0228862 A1* | 10/2007 | Welchko | H02K 1/2766 310/156.53 |
| 2009/0128074 A1* | 5/2009 | Hu | H02P 6/183 318/400.33 |
| 2010/0171455 A1* | 7/2010 | Schulz | H02P 6/183 318/400.33 |
| 2011/0234135 A1* | 9/2011 | Kato | H02P 6/183 318/400.33 |

* cited by examiner

METHOD FOR DETERMINING THE POLARITY OF A ROTOR POLE OF AN ELECTRICAL ROTATING MACHINE

The present invention relates to electrical rotating machines and in particular those comprising a rotor having permanent magnets.

The object of the invention is to determine the position of at least one pole of the rotor having permanent magnets at standstill and without the use of conventional position sensors.

The invention more particularly relates to a method for determining the position of at least one pole of a rotor having permanent magnets and also to a device for determining the position of poles.

The invention applies in general to synchronous motors comprising a rotor having permanent magnets, and preferably to synchro-reluctant motors having permanent magnets or to machines having a flux concentrated rotor.

The control of a synchronous motor having permanent magnets is based on the knowledge of the position of the rotor and in particular of the position and polarity of the north and south poles of the rotor. It is necessary to know the position and the polarity of the poles both at start-up, when the rotor is at a standstill, and also during operation, when the rotor is rotating.

For this purpose, it is well known to use position sensors, such as Hall effect sensors, encoders, resolvers, or any other type of physical sensor. However, the use of such sensors results in a certain overcrowding, an extra cost, and also a risk of failure due to the use of an additional component.

It is also known, when the rotor is moving, either to use a voltage sensor integrated in a variator of the machine, or to circulate a current in the motor by applying a zero voltage at the output of the variator, for example, which current may be detected and analyzed by the variator. The direction of this current is directly linked to the direction of the rotor. Devices of this type are known for example from publications U.S. Pat. No. 6,163,127, US2004/0070362 and US2007/0040528.

When the rotor is at a standstill, different methods make it possible to obtain information regarding the position of the rotor, however information regarding the polarity of the poles is absent, unreliable, or costly to obtain.

It is possible to align the rotor of the motor in a position known by the variator by injecting thereinto a direct current of known direction and by waiting for the rotor, which must then be free, to align itself in this direction. In a variant, in the case in which the load torque at start-up is low, observers capable of converging without bias toward the correct position of the machine may also be used.

Further methods utilize the salience of the rotor. High-frequency signals may be injected in order to determine the position of the rotor at approximately 180 electrical degrees, that is to say the position of the poles of the rotor is known, but the north or south polarity thereof is not known, as described in application US 2010/0171455.

In order to know the polarity of the poles, the higher order harmonics of the injected frequency, in particular the second order harmonics, may be analyzed, as described in application US 2009/0128074. However, it is then necessary to use very accurate current sensors, which are therefore costly, in order to measure these variables, which, by virtue of their harmonics order, are of very low value.

Another method consists of injecting a square-wave voltage and of analyzing the response obtained in current in order to determine the polarity of the poles. In this method, the phenomenon of saturation at the stator is used by building on the measured flux variations relative to the no-load flux of the magnets, which polarizes the magnetic circuit of the stator. The result of the method described above is all the more reliable, the greater is the no-load flux of the magnets, so as to obtain a sufficiently significant distance between the flux variations. However, this is only the case when the flux produced by the rotor across the magnetic circuit of the stator is sufficiently significant, i.e. for example in the case of a rotor having a high flux concentration or in the case of magnets having a high energy density, for example thanks to the use of rare earths for the magnets of the rotor.

By contrast, this method does not provide good results when applied to a synchro-reluctant motor comprising permanent magnets at the rotor, and more particularly when these permanent magnets have a low energy density, these being, for example, magnets made of ferrite. In effect, in the case of synchro-reluctant motors and use with a rotor having permanent magnets with a low energy density, the no-load flux may be too low for the result obtained to be sufficiently reliable, and a high error rate may result. In addition, in order to remedy this problem, it could be attempted to obtain a greater current variation, however this may induce a high risk of demagnetization of the low energy density magnets.

There is also a need to benefit from a method for determining the position and the polarity of the poles of a rotor of an electrical rotating machine with greater reliability and at lower cost, even in the case in which the no-load flux of the magnets is relatively low.

The invention aims to satisfy this need and thus relates, in accordance with a first of its aspects, to a method for determining the polarity of a pole of a rotor of an electrical rotating machine having an estimated position relative to a stator, the method comprising the following steps:

a) applying an excitation voltage to the stator so as to generate two different magnetic fluxes successively within a saturable magnetic zone of said pole, one flux in conjunction with and the other in opposition to the magnetic flux of the magnets, so as to saturate the saturable magnetic zone for at least one of the magnetic fluxes, and b) determining the polarity of the pole on the basis of the differences in the temporal evolution of the current generated in the stator by the two magnetic fluxes. The method according to the invention is preferably implemented at standstill, that is to say before the machine is set in rotation.

In the invention, it is not the saturation of the stator that is utilized, but the saturation of the rotor in order to determine the polarity of the poles of the rotor. The method according to the invention makes it possible to know the polarity of the poles of the rotor with no risk of demagnetization of the magnets, this risk being all the greater when the magnets have a low energy density, moreover with satisfactory reliability.

In addition, it is possible to avoid the use of conventional position sensors, which makes it possible to reduce the cost of the machine and to eliminate the risks of malfunction and maintenance of the position sensor.

The method according to the invention reduces the risks of undesired rotation of the rotor.

The presence of saturable magnetic zones of the rotor may also serve to improve the assembly of the different components of the rotor, in particular the permanent magnets and the magnetic rotor mass, and may contribute to the mechanical robustness of the rotor.

The term "saturable magnetic zone" of the rotor means zones of the magnetic circuit of the rotor which may be saturated very rapidly, that is to say prior to the saturation of the rest of the magnetic circuit of the rotor.

The presence of saturable magnetic zones makes it possible to add to the flux of the magnets or to subtract from the flux of the magnets the flux created in the magnetic circuit of the rotor by the current circulating in the windings of the stator. In effect, the resulting current rises more quickly when the flux created is in phase opposition with the flux of the magnets. This is explained by the fact that the leakage flux of the magnets through the saturable magnetic zones polarizes these zones of the magnetic circuit of the rotor, thus causing a reduction of the inductance of the machine.

Each pole of the rotor comprises at least one saturable magnetic zone.

The rotor preferably comprises permanent magnets having a low energy density. The permanent magnets may be made of ferrite, for example.

The magnets may, in a variant, be of a high energy density, but with a low no-load flux. The term "low no-load flux" means that the electromotive force for an applied voltage of 100 V is less than 65 V, even better less than 50 V.

The excitation of the stator with voltage may consist in applying a first and a second voltage to the stator, which voltages may be in the form of a square-wave voltage, for example having a form selected from the following list: square-wave voltage, voltage ramp, sine voltage wave, or any combination of these forms, this list not being exhaustive.

The first and second voltages may be of opposite sign.

The second voltage is preferably of the same amplitude as the first voltage.

The resulting currents may be between 0% of the maximum current before de-magnetization and 100% of the maximum current leading to an onset of demagnetization of the magnets, or even less than this maximum current, even better less than 50% of the maximum current, said currents being for example between 2.5% and 50% of the maximum current, even better between 5% and 40% of the maximum current. Sufficient variations to allow a distinction of the polarity of the pole caused by the presence of saturable magnetic zones are retained. With a rotor devoid of saturable magnetic zones, a current greater than the value of the maximum current would be required in order to be able to distinguish a difference in the variations of current and to determine the polarity of the poles. There would then be significant risks of demagnetization of the magnets.

In step b) it is determined which of the currents generated in the stator by the two magnetic fluxes is the weaker and/or or the later in relation to the other. The current generated that is the weaker or the later in relation to the other indicates which of the two voltages has been applied in conjunction with the magnet or magnets of the corresponding pole, that is to say the sought indication regarding the polarity of the studied pole is thus obtained. If the positive voltage applied generates a flux in conjunction with the flux of the permanent magnets, this is the north pole. The current having the weaker amplitude corresponds to the application of a voltage generating a flux in conjunction with the north pole.

In other words, the north pole of the rotor corresponds to the case in which the level of current is weaker at the end of a same duration and for a same amplitude of the applied voltage. In a complementary manner, the south pole of the rotor corresponds to the case in which the level of current is higher at the end of a same duration and for a same amplitude of the applied voltage.

It should be noted that this goes against the criterion generally established for machines having permanent magnets with a high energy density. This originates from the fact that, in the invention, the phenomenon of saturation of saturable magnetic zones of the rotor is utilized. The current rises more quickly when the flux created is in phase opposition with the flux of the magnets. This is explained by the fact that the leakage flux of the magnets through the saturable magnetic zones polarizes the zones of the magnetic circuit of the rotor; this results in a reduction of the inductance of the machine In a variant or additionally, it is possible to determine in step b) the sign of the phase of one of the harmonics, in particular the second harmonic, by having excited the stator in step a) with a high-frequency signal.

The case in which the sign of the phase is positive corresponds to the application of a high-frequency signal generating a flux in conjunction with the north pole, which is the contrary of the generally established criterion.

It is possible to determine the estimated position of the pole of the rotor relative to the stator by applying high-frequency signals to the stator and then by analyzing the resultant voltages and high-frequency currents in order to deduce therefrom the position of a pole of the rotor. This position of a pole of the rotor has an inaccuracy with regard to the polarity of the pole.

The injection of high-frequency signals does not require any mechanical blocking of the rotor. The method for determining the polarity of a pole may be carried out without having to mechanically constrain the shaft of the machine in order to prevent rotation thereof.

Bridges

The rotor may comprise permanent magnets disposed in seats so as to define poles of the rotor. The seats may be disposed in the form of the arc of a circle or in a V-shape.

A saturable magnetic zone may be (i) a bridge made of magnetic material formed between the seats of the rotor intended to receive the permanent magnets, which are disposed so as to define the poles of the rotor, and/or (ii) a bridge made of magnetic material disposed between a seat and the air gap of the machine. The saturable magnetic zones may be disposed on either side of the magnets.

The bridges formed between the seats may be oriented radially, that is to say disposed along a radial axis of the corresponding pole. The term "radial axis of the pole" means an axis of the pole oriented radially, i.e. along a radius of the rotor. It may be an axis of symmetry for the pole. This radial axis may intersect the tip of the pole In a variant, they may be oriented obliquely, that is to say that the material bridge extends generally along a longitudinal axis of the bridge oriented obliquely, approaching the radial axis of the corresponding pole of the rotor with increasing distance from the axis of rotation. The material bridges oriented obliquely make it possible to withstand the centrifugal forces to which the rotor may be subjected, without compromising the machine in terms of its magnetic properties. The term "longitudinal axis of the bridge" denotes the axis disposed centrally relative to the two short sides of the adjacent seats defining this material bridge. This axis is preferably straight. The material bridges formed between the seats may extend obliquely generally along a longitudinal axis of the bridge, which, with the radial axis of the corresponding pole of the rotor, may form an angle of a value not equal to zero and greater than 5°, even better greater than 10°, for example of approximately 15°. The angle may be smaller than 45°, even better smaller than 30°, or smaller than 20°.

The material bridges oriented circumferentially make it possible to maintain the cohesion of the rotor against the mechanical forces to which the machine is subjected.

The material bridges may have a width, measured perpendicularly to their longitudinal axis, of less than 8 mm, even better less than 7 mm. In order to optimize the distribution of the magnetic flux in the rotor, it is sought to limit the size of the bridges in order to minimize the passage of the magnetic flux into these bridges and the flux losses in the pole. By contrast, it is necessary that these bridges have a thickness sufficient to avoid breakage thereof, the rotor being very heavily acted on by the centrifugal forces. The material bridges may have a width greater than 0.5 mm, or greater than 6 mm.

Device

The invention, in accordance with another of its aspects, independently or in combination with the above, also relates to a device for determining the polarity of a pole of an electrical rotating machine having an estimated position relative to a stator, the device comprising:

a) means for applying an excitation voltage to the stator so as to generate two different magnetic fluxes successively within a saturable magnetic zone of said pole, one flux in conjunction with and the other in opposition to the magnetic flux of the magnets, so as to saturate the saturable magnetic zone for at least one of the magnetic fluxes, and b) means for determining the polarity of the pole on the basis of the differences in the temporal evolution of the current generated in the stator by the two magnetic fluxes.

Variator and Machine

The invention, in accordance with another of its aspects, also relates to a frequency variator for an electric motor, comprising a device for determining the polarity as described above.

The invention, in accordance with another of its aspects, also relates to an electrical rotating machine, comprising:

a motor comprising a rotor having permanent magnets, and a variator as described above, for controlling the motor.

The machine may comprise a stator wound over teeth. In a variant, the stator may be a stator having distributed windings.

The machine may constitute a synchronous motor.

The machine is preferably devoid of a conventional position sensor. In other words, thanks to the machine according to the invention, the polarity of the pole in question may be obtained without the use of a conventional position sensor.

The machine may function at a nominal peripheral speed (tangential speed taken at the outer diameter of the rotor), which may be greater than or equal to 100 meters per second, the machine according to the invention allowing an operation at significant speeds if this is desired.

The machine may be of a relatively large size. The diameter of the rotor may be greater than 50 mm, even better greater than 80 mm, for example being between 80 and 500 mm.

Rotor

The rotor comprises a magnetic rotor mass, in which there are formed seats intended to receive the permanent magnets, so as to define the poles of the rotor. The rotor may comprise at least one magnet per pole, for example a single magnet per pole, or in a variant two magnets, or even more magnets per pole.

The rotor may be a flux concentration or synchro-reluctant rotor having permanent magnets.

Each pole of the rotor may comprise at least one saturable magnetic zone.

The rotor may comprise at least three seats per pole, each pole having a radial axis of the pole, permanent magnets being inserted into the seats. Permanent magnets may be inserted into all or some of the seats, for example into at least half of the seats, or into more than two thirds of the seats, or even better still into all of the seats.

The seats may be of elongate form and may each comprise two short sides. The seats may be disposed in one or more rows per pole, one row comprising at least two, even better at least three seats disposed successively, the short sides of said seats defining a material bridge between two successive seats of the same row.

The arrangement of the seats in rows makes it possible to concentrate the flux of the magnets and to introduce a magnetic salience in order to obtain beneficial performances with ferrite magnets.

In an exemplary embodiment the seats in the same row are disposed along a central branch and two lateral branches situated on either side of the central branch, for example resulting in a U-shaped configuration, the central branch for example being the only one to comprise one or more permanent magnets, the lateral branches not housing any permanent magnets.

For a same pole, the seats in this pole may be disposed in a single row. The concavity of the row may be oriented toward the tip of the pole, i.e. toward the air gap.

Preferably, for a same pole, the seats in this pole are disposed in a number of rows, each having a concavity that may be oriented toward the tip of the pole, in particular in substantially concentric rows. The term "concentric" means that the median axes of the seats in the rows, considered in a plane perpendicular to the axis of rotation of the rotor, intersect one another at the same point. This arrangement in a number of concentric rows makes it possible to improve the concentration of the flux and the magnetic salience without necessarily having to increase the size of the seats or the number of permanent magnets necessary for obtaining equivalent performances. The number of rows per pole may be, in particular, two, three or four.

When the rotor comprises a number of rows for the same pole, said rows may be of increasing length as considered in a direction toward the air gap, the longest row being closest to the axis of rotation and the shortest row being disposed on the air gap side. The length of a row corresponds to the cumulative length of the seats in this row.

At the least, two seats in two rows of the same pole may extend parallel to one another. All the seats in a row may extend parallel to the corresponding seats in another row.

A row may have a number of seats strictly greater than one, for example at least two seats, and even better three seats. A row may, for example, comprise a central seat and two lateral seats. At least one row may comprise an uneven number of seats, for example at least three seats.

Two rows of the same pole may have a different number of seats. In an exemplary embodiment of the invention, at least one pole comprises a row of seats comprising a number of seats less than the number of seats in another row of this pole, for example two seats compared with three for the other row. The row having the lower number of seats is preferably closest to the air gap and distanced furthest from the axis of rotation.

The arrangement of the seats and/or of the material bridges in a row is preferably symmetrical with respect to the radial axis of the pole.

In a row, the seats may be disposed in a V shape or in a U shape, the U shape possibly having a form flared toward the air gap. In other words, the seats constituting the lateral branches of the U may be non-parallel to one another. Thus, the inclination of the radial bridges may be opposite that of the lateral seats, relative to the radial axis of the pole.

The seats may each extend, when viewed in section in a plane perpendicular to the axis of rotation of the rotor, in a longitudinal axis, which may be straight or curved.

The seats may have a constant or variable width as considered along the length of the longitudinal axis thereof, in a plane perpendicular to the axis of rotation of the rotor.

The short sides of a seat are oriented in the direction of the radial axis of the pole with increasing distance from the axis of rotation, and converge for example substantially toward the tip of the pole.

The seats may have, in cross section, that is to say perpendicularly to the axis of rotation, a generally rectangular or trapezoidal shape, this list not being exhaustive.

The short sides of a seat may be perpendicular to the long sides of the seat. The short sides of a seat may be inclined relative to the long sides of the seat.

At least one seat may have two long sides, one of the long sides being shorter than the other. In this case, for example when the seat is of generally trapezoidal shape, the shorter of the long sides may be situated closer to the air gap than the longer of the long sides.

The short sides of a seat may be straight or curved.

The permanent magnets may be of general rectangular shape. Taking into account the shape of the seats, the placement of the magnets in the seats may leave a free space in the seat between the magnets and the short sides of the corresponding seat. The free space is for example of general triangular shape.

The rotor mass may be formed from a stack of laminations or from one or more individual lamination(s) wound over itself/themselves about the axis of rotation. Each lamination layer of the rotor mass may be formed in one piece. The rotor may be devoid of individual polar pieces.

The rotor may comprise a number of poles between 2 and 12, even better between 4 and 8.

Figure 2:
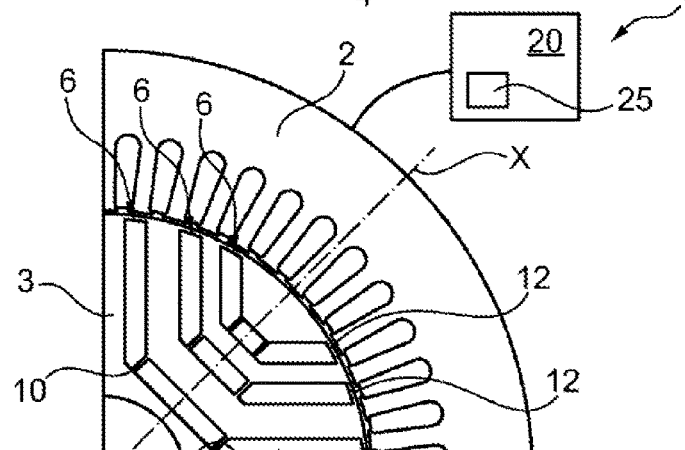
Figure 2A:
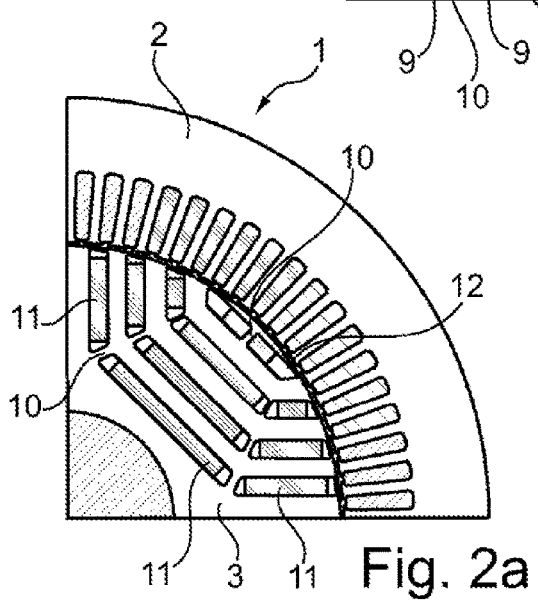
Figure 2B:
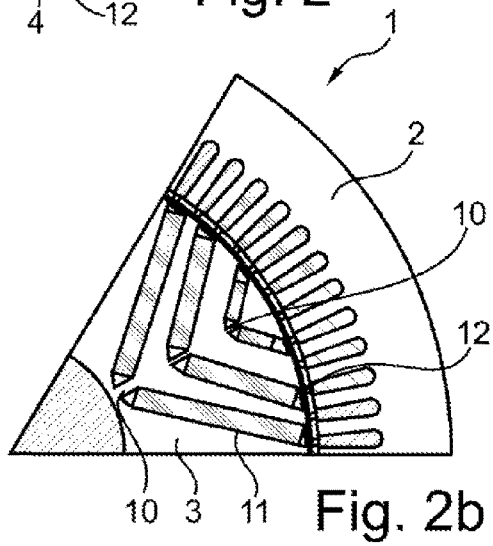
Figure 3:
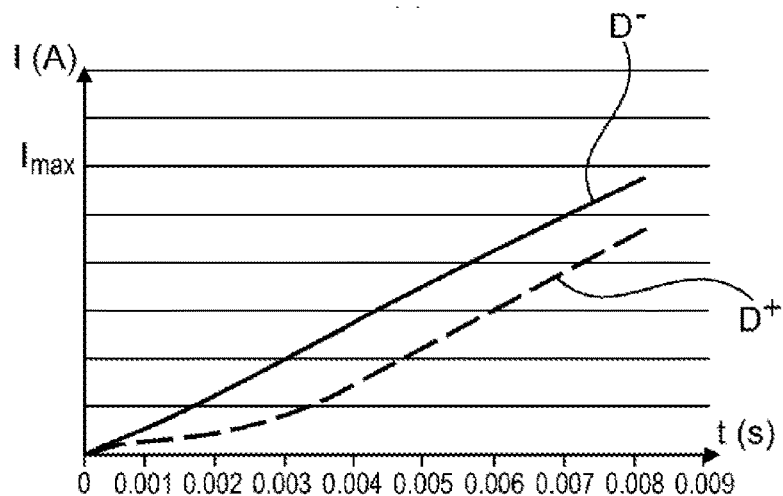
Figure 4:
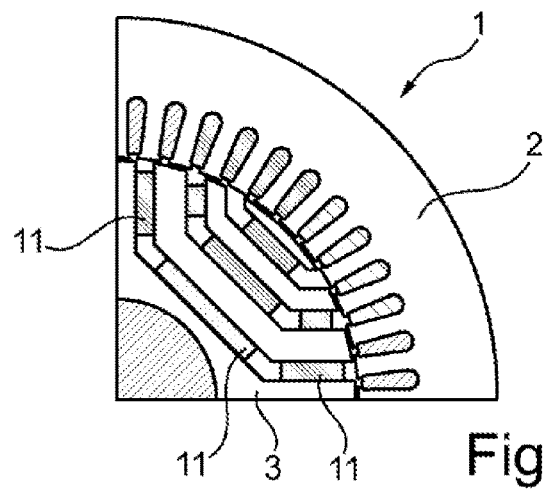
Figure 5:
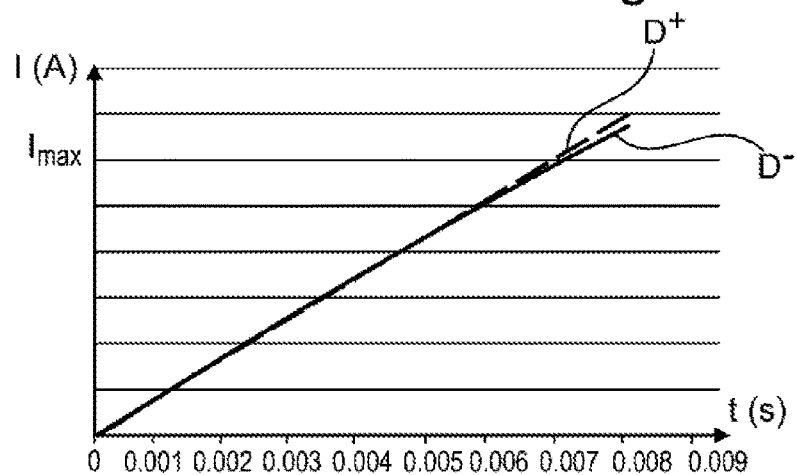
Figure 6A:
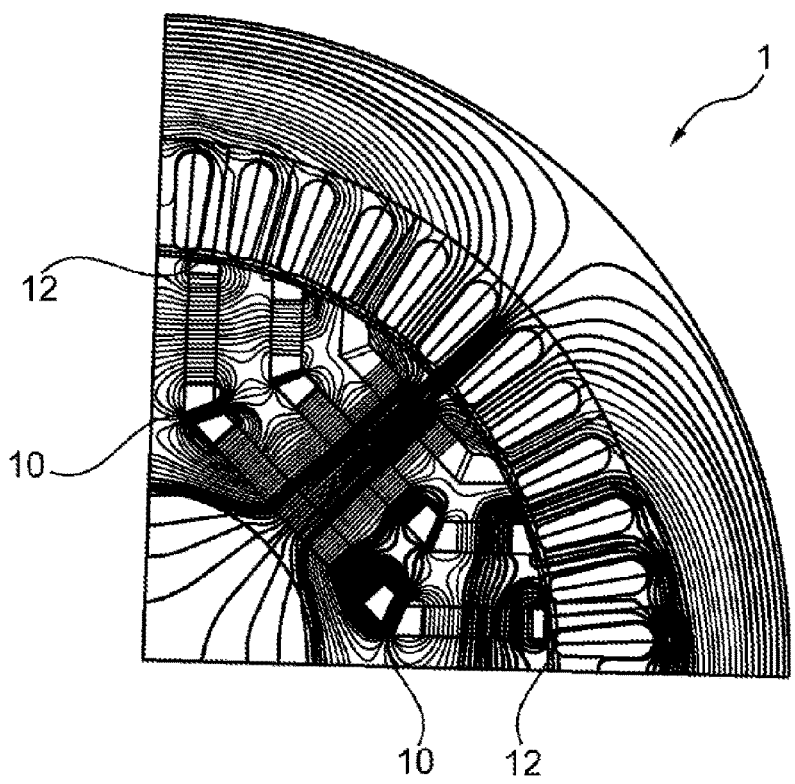
Figure 6B:
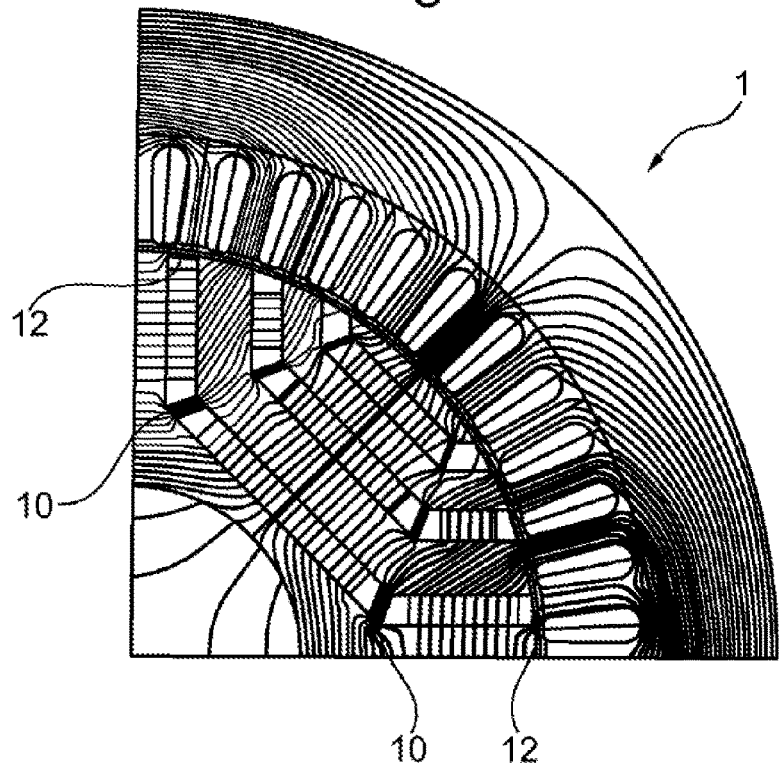
Figure 7:
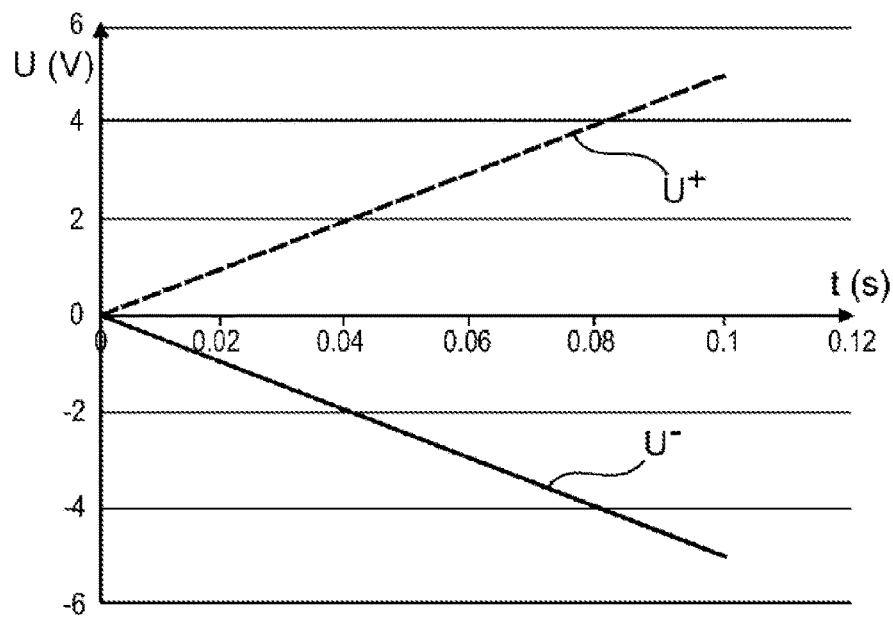
Figure 8:
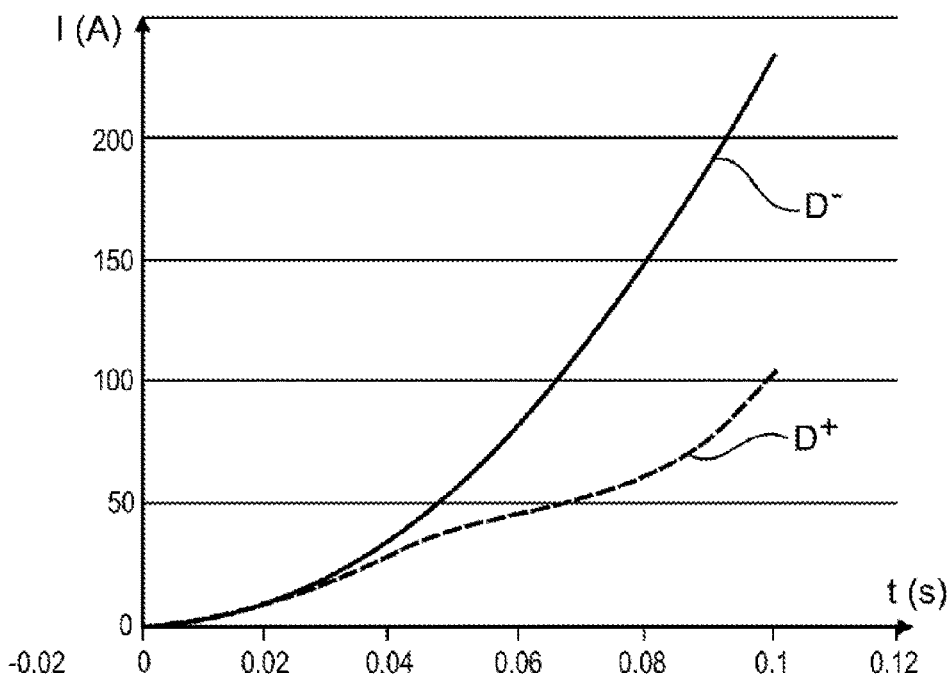

The invention will be better understood upon reading the following detailed description of non-limiting exemplary embodiments thereof and upon examination of the accompanying drawing, in which:

FIG. 1 is a schematic and partial view of an electrical rotating machine according to the invention, FIGS. 2, 2a and 2b are views, similar to FIG. 1, of variant embodiments, FIG. 3 illustrates the evolution of the current in the stator of FIG. 1 during the application of a square-wave voltage, FIG. 4 is a view similar to FIG. 1 of a machine devoid of saturable magnetic zones FIG. 5 illustrates the development of the current in the stator of FIG. 4 during the application of a square-wave voltage, FIGS. 6a and 6b illustrate the development of the field lines in the machine of FIG. 1, FIG. 7 illustrates a voltage ramp, FIG. 8 illustrates the development of the current in the stator of FIG. 1 during the application of a voltage ramp, FIGS. 9a, 9b, 9c, 11a, 11b and 11c illustrate, respectively, the measurements of the speed, of the position and of the voltage and of the intensity in the machine of FIG. 1 during two implementations of the method of the invention, and FIGS. 10a and 10b and 12a and 12b are views of details, respectively, of FIGS. 9b and 9c and 11b and 11c.

FIG. 1 illustrates an electrical rotating machine 1, comprising a stator 2 and a flux concentration rotor 3, having a magnetic rotor mass 4 in which there are formed seats 5 so as to define the poles of the rotor, each pole having a radial axis X.

In this example, the rotor comprises nine seats 5 per pole, which are disposed in three concentric rows 6 about each of the poles, the concavity of the rows being oriented toward the air gap. A row 6 comprises three seats 5 disposed successively in the row. The three rows 6 of the same pole are of decreasing length in the direction of the air gap, the longest being situated on the axis of rotation side and the shortest being situated on the air gap side.

The seats 5 are of elongate form. They each comprise two short sides 9, the respective short sides 9 of two successive seats 5 in the same row 6 defining therebetween a material bridge 10. The material bridge 10 extends generally along a longitudinal axis Z of the bridge oriented so as to approach the radial axis X of the corresponding pole of the rotor 1 with increasing distance from the axis of rotation. The longitudinal axis Z of the material bridge 10 is straight and, with the radial axis X of the corresponding pole of the rotor, forms an angle α having a value not equal to zero and greater than 5°, which is in this example approximately 15°.

The short sides 9 of a seat are oriented in the direction of the radial axis X of the pole in the direction toward the air gap. The seats 5 are of general trapezoidal shape and have two long sides, one of the long sides being shorter than the other, the shortest of the long sides being closer to the air gap than the longer of the long sides.

The lateral seats are separated from the air gap by circumferential material bridges 12. These circumferential material bridges 12 take up only a rather small proportion of the centrifugal forces, whereas the bridges 10 separating two seats must withstand the majority of the load of the centrifugal forces.

The rotor 1 may comprise permanent magnets 11 inserted into each or certain ones of the seats 5. The permanent magnets have a low energy density. The permanent magnets 11 are in this example of generally rectangular shape in cross section. The placement of the magnets in the seats may leave a free space 15 in each seat between the magnet and the short sides of the corresponding seat.

As can be seen in FIG. 1, some of the seats may be devoid of a magnet. In the illustrated exemplary embodiment, the seats in one of the rows are disposed in a central branch and two lateral branches, the central branch being the only one to comprise a permanent magnet, the lateral seats not comprising a permanent magnet.

In addition, it can be seen in FIG. 1 that the central seats of a row may have a length greater than that of the lateral seats in said row, and that the lateral branches of the U are shorter than the central branch.

The situation is the opposite in the variant illustrated in FIG. 2.

In addition, in FIG. 2, the bridges formed between the seats are oriented radially, that is to say are disposed along a radial axis of the corresponding pole.

In a further variant, the row D of seats closest to the air gap may comprise a central bridge 10, as illustrated in FIG. 2a.

In a further variant, the seats may be disposed in a V shape rather than a U shape, as illustrated in FIG. 2b.

The material bridges 10 and the circumferential bridges 12 that have just been described form saturable magnetic zones of the rotor.

The machine 1 illustrated in FIG. 1 also comprises a variator 20 for controlling the motor, which comprises a device 25 for determining, at standstill, the polarity of the poles of the rotor, the machine being devoid of a conventional position sensor.

The device 25 for determining the polarity comprises:

a) means for applying an excitation voltage to the stator 2 so as to generate two different magnetic fluxes successively within a saturable magnetic zone 10, 12 of said pole, one flux in conjunction with and the other in opposition to the magnetic flux of the magnets 11, so as to saturate the saturable magnetic zone 10, 12 for at least one of the magnetic fluxes, and b) means for determining the polarity of the pole on the basis of the differences in the temporal evolution of the current generated in the stator by the two magnetic fluxes.

The operation of this device and the sequence of the method for determining the polarity according to the invention will now be described.

Determination of the Position of the Poles

In the absence of current in the windings of the stator, the permanent magnets polarize the magnetic circuit.

In a first step, an estimated position of a pole of the rotor is determined, for example by applying high-frequency signals to the stator and then by analyzing the resultant voltages and high-frequency currents in order to deduce therefrom the position of the pole of the rotor.

In a variant, this determination may be performed by any other means.

In this step, a hypothesis is made regarding the polarity of the pole, which is currently unknown at approximately 180 electrical degrees, and which will be confirmed or rejected in the following steps.

Application of an Excitation Voltage

When a voltage is applied to the stator in the form of a square-wave voltage for a defined time t so as to create a magnetic flux in a storable magnetic zone 10, 12 of said pole of the rotor, a resultant current may be measured in the stator.

FIG. 3 shows the evolution of the current in the windings of the stator of FIG. 1 when the flux created by a square-wave voltage is applied in conjunction with (curve D+) or in phase opposition to (curve D−) the flux of the magnets.

The appearance of the current curve D+ in the case in which the flux created by the square-wave voltage is in conjunction with the flux of the magnets is due to the inversion of the direction of the flux in the saturable magnetic zones 10, 12 of the rotor, as can be seen in FIGS. 6a and 6b, which show the evolution of the distribution of the flux in the motor of FIG. 1 in the case in which the flux created is in conjunction with that of the magnets. The evolution of the field lines in the different saturable magnetic zones 10, 12 of the rotor should be noted. FIG. 6a illustrates the flux at t=0 s and FIG. 6b at t=0.0035 s. The presence of the storable magnetic zones 10, 12 slows the rise of the current and makes it possible to differentiate the directions of the north and south poles, as will be explained hereinafter.

By contrast, FIG. 5 shows the evolution of the current in the windings of the stator when the flux created by the square-wave voltage is applied in conjunction with (curve D+) or in phase opposition to (curve D−) the flux of the magnets, in the case in which the rotor does not have any saturable magnetic zones, as is the case for the machine of FIG. 4, which comprises a rotor having magnets with low energy density, but devoid of saturable magnetic zones.

Without these saturable magnetic zones, a current greater than the maximum current before demagnetization $I_{max}$ is required in order to commence with detection of the directions of the poles. There are high risks of demagnetizing the magnets if a current that is so high is used. By contrast, with low levels of current, less than the maximum current $I_{max}$, for example between 2.5% and 50% of the maximum current $I_{max}$ and saturable magnetic zones, the distinction between the evolution of the current in the two cases is clearer. This eliminates the risk of demagnetization of the magnets.

It can also be seen that, without saturable magnetic zones, the application of a voltage in the two directions does not make it possible to distinguish the directions of the poles with precision or in a robust manner.

With reference to FIGS. 9a to 9c and 10a and 10b an exemplary embodiment of the method according to the invention will now be described, with the machine of FIG. 2, which is a synchro-reluctant machine having permanent magnets made of ferrite. The measurements are taken with the variator 20.

Figure 9A:
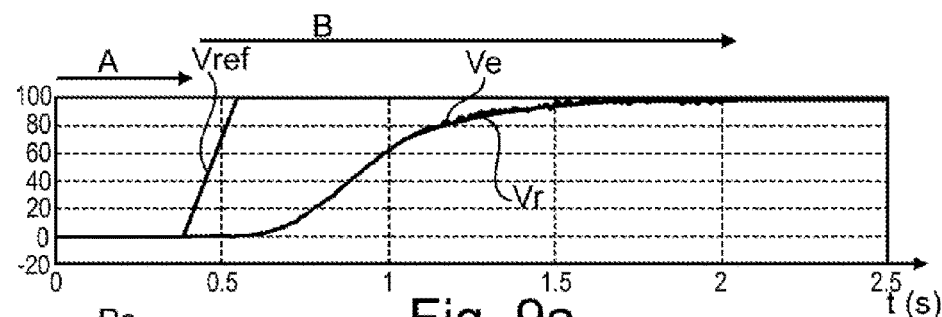
Figure 10A:
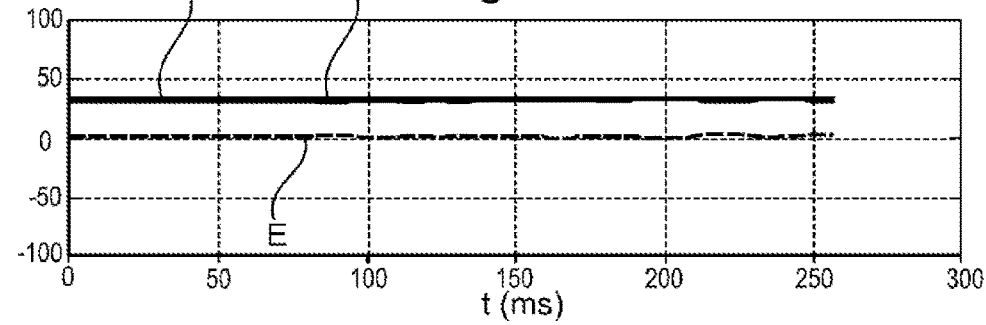
Figure 10B:
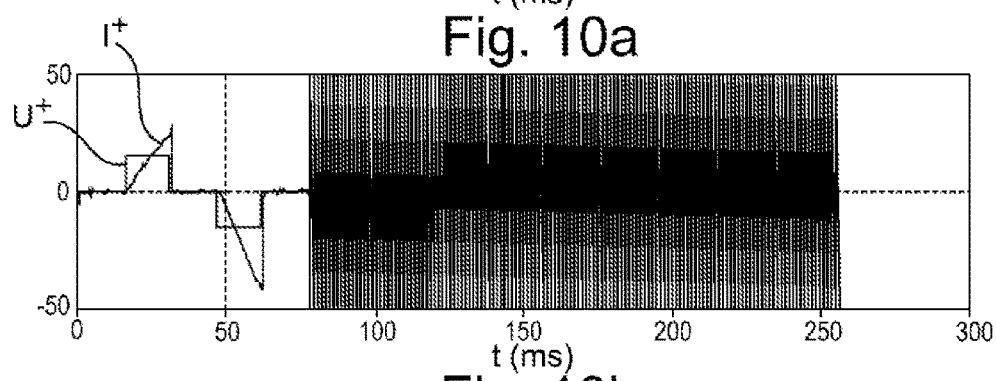

Firstly, the machine is started with a speed setpoint Vref of 100 rpm, as illustrated in FIG. 9a, which shows the temporal evolution of the setpoint speed Vref, of the estimated speed Ve, and of the actual speed Vr. The phase A is that of the determination of the initial position, followed by the phase B of effective start-up. The phase A comprises a phase A1 of determination of the estimated position Pe and a phase A2 of determination of the polarity. FIGS. 10a and 10b are views of details of the phase A2.

Figure 9B:
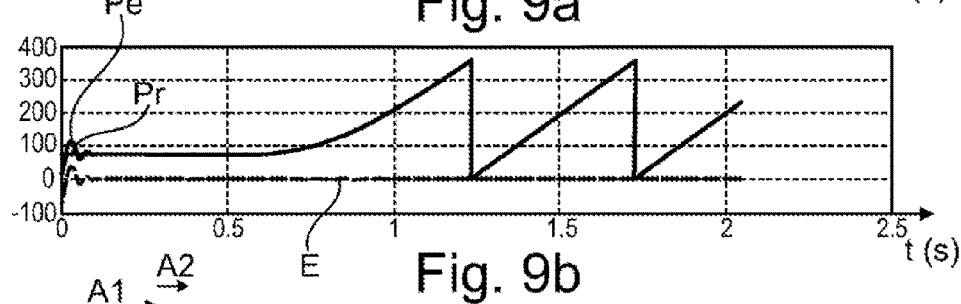

Firstly, an estimated position Pe is determined as described above (phase A1). In fact, this estimated position Pe in reality has an ambiguity of 180 electrical degrees, which will be eliminated thanks to phase A2. FIGS. 9b and 10a show the temporal evolution of the actual position Pr, of the estimated position Pe, and of the error E between the two.

To do this, a first voltage is applied in the form of a small square-wave voltage for a defined time t so as to create a magnetic flux in a saturable magnetic zone 10, 12 of said pole of the rotor, and a first resulting current is measured in the stator.

A second voltage is then applied in the form of a second square-wave voltage phase-shifted spatially by 180 electrical degrees relative to the first square-wave voltage during the defined time t so as to create a magnetic flux in the saturable magnetic zone 10, 12 of said pole of the rotor, and a second resultant current is measured in the stator.

Figure 9C:
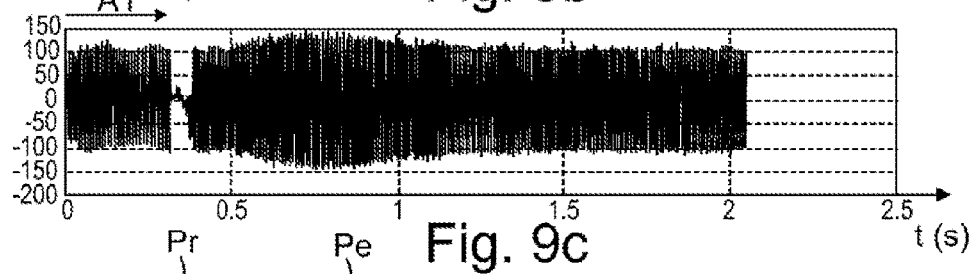

The development of the voltage U+ and of the resultant intensity I+ is illustrated in FIGS. 9c and 10b.

In one case, a flux is thus created in the same direction as that of the magnets—in conjunction—and in the other case a flux in phase opposition relative to the flux of the magnets.

In the above, a square-wave voltage is used. Of course, the scope of the present invention will not be departed from if the situation is otherwise, and for example another form may be used for the excitation voltage.

By way of example, FIGS. 7 and 8 illustrate the use of a voltage ramp. A voltage ramp U+ is applied as illustrated in FIG. 7 for a defined time t so as to create a flux oriented in the same direction as that of the magnets, then the same voltage ramp U−, but phase-shifted spatially by 180 electrical degrees is applied. By doing so, in one case the flux created by the voltage ramp will be in the same direction as that of the magnets—in conjunction—and in the other case it will be in phase opposition relative to the flux of the magnets.

FIG. 8 shows the evolution of the current in the windings of the motor when the flux created by the voltage ramp U+ is applied in conjunction with (curve D+) or in phase opposition to (curve D−) the flux of the magnets and in the case in which the rotor has saturable magnetic circuits. At the start of a defined time t it can be seen that the current reaches two different values, which makes it possible to distinguish the directions of the north and south poles.

In a further variant, the excitation of the stator by sinusoidal voltages may make it possible to determine the polarity of the poles of the rotor. In this case the sign of the phase of the component of the current generated at twice the excitation frequency (second order harmonics) is detected. The north pole corresponds to a positive phase shift, which is the inverse of the criterion generally considered in the conventional solutions implementing sinusoidal voltages for the detection of the polarity.

Determination of the Polarity

The polarity of the pole of the rotor may be deduced on the basis of the first and second currents measured, which are generated in the stator by the two magnetic fluxes. To do this, it is determined in step b) which of the first and second currents is weaker and/or later in relation to the other.

The north pole of the rotor corresponds to the case in which the level of current is weaker at the start of the same period and for the same amplitude of the applied voltage.

In the test of FIGS. 9a to 9c, the amplitude of the current resulting from the first square-wave voltage is weaker than the second, as shown in detail in FIG. 10b. The first variation of current is approximately 26 A, the second −40 A. The maximum current of the motor is 230 A. At the same time, there is thus a sufficiently distinct difference of 11.3% and −17.5% in order to make a reliable decision whilst remaining at low current levels compared with the maximum current.

By contrast to the conventional situation, it is concluded here that the estimated position Pe is the correct position, as confirmed by the measurement Pr indicated by a position sensor (resolver) used here merely by way of verification, illustrated in FIGS. 9b and 10a.

The variator then starts with this position (phase B), and it can be seen in FIG. 9b that there is a good superimposition between the angle given by the position sensor and the angle obtained without mechanical sensor by the method according to the invention.

Figure 11A:
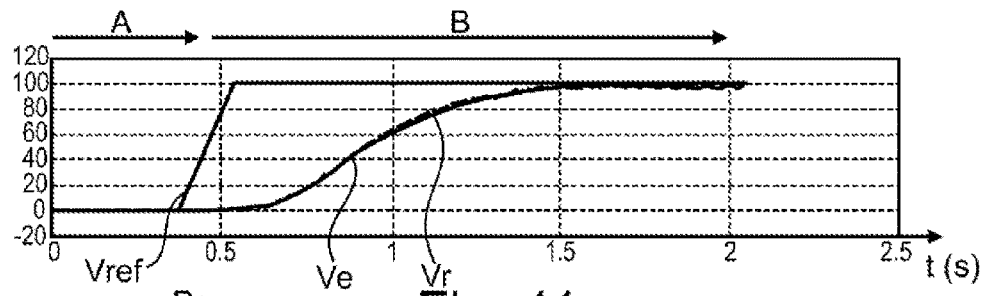
Figure 11B:
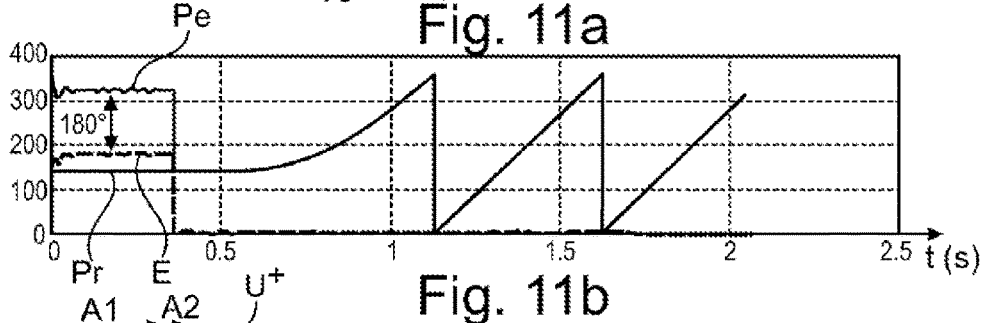
Figure 11C:
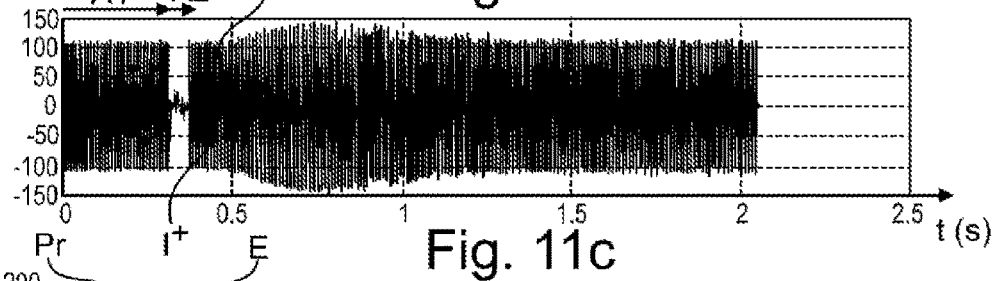
Figure 12A:
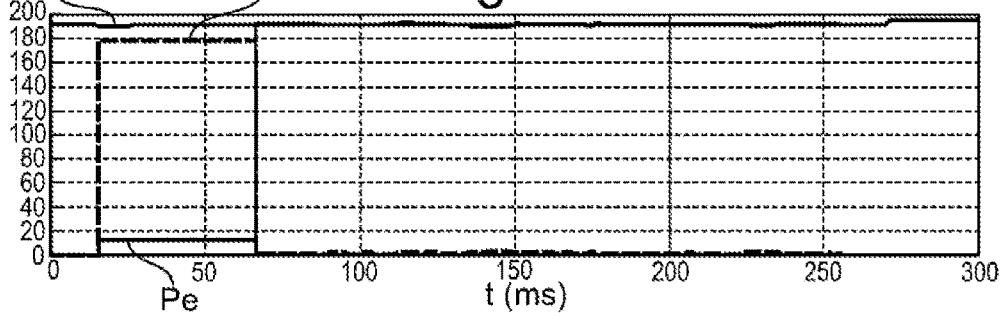
Figure 12B:
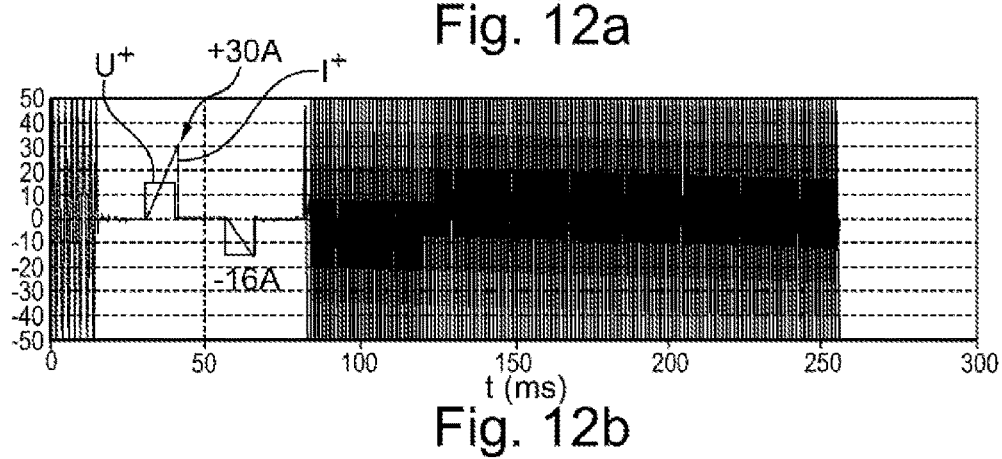

In the variant illustrated in FIGS. 11a to 11c and 12a to 12b, everything is identical to the previous test except that, at the end of the phase A1, the estimated position Pe is at 180 electrical degrees from that Pr indicated by the resolver, as indicated by the curve of FIG. 11b. At the end of the phase A2, the current corresponding to the first square-wave voltage is greatest, the first current variation being 30 A, the second being −16 A, which respectively are +13% and −7%. The difference is sufficiently distinct between the two directions such that elimination of the ambiguity of the polarity is very clear with identified current levels still largely below the nominal current. It can be deduced from this (here too in contrast to the conventional approach) that the correct position is at 180 electrical degrees, and this value is added to the estimated position Pe, after which the position Pe superimposes the actual position Pr observed by the resolver, and the error E falls to 0.

In order to also avoid the risk of demagnetization, one of the advantages of the method of the invention is its low risk of setting the rotor in rotation during the test, this risk still existing with the very high levels of current of the conventional solution when the measurement of the estimated position is distanced from the actual position.

The invention is not limited to the illustrated examples. In particular, the polarity of the rotor may be modified without departing from the scope of the present invention.

The rotor may cooperate with any type of stator, with distributed or concentrated windings.

The term "comprising a" should be understood to be synonymous with "comprising at least one".

The invention claimed is:

1. A method for determining the polarity of a pole of a rotor of an electrical rotating machine having an estimated position relative to a stator, the method comprising the following steps:
   a) applying an excitation voltage to the stator so as to generate two different magnetic fluxes successively within a saturable magnetic zone of said pole, one flux in conjunction with and the other in opposition to the magnetic flux of magnets of the rotor defining the pole of the rotor, so as to saturate the saturable magnetic zone for at least one of the magnetic fluxes, and
   b) determining the polarity of the pole on the basis of the differences in the temporal evolution of the current generated in the stator by the two magnetic fluxes, in which the resultant currents are less than the maximum current before demagnetization.

2. The method as claimed in claim 1, in which the rotor comprises permanent magnets having a low energy density.

3. The method as claimed in claim 1, which is implemented at standstill, that is to say before the machine is set in rotation.

4. The method as claimed in claim 1, in which the application of an excitation voltage to the stator consists in applying a first and a second voltage to the stator, which voltages have a form selected from the following list: square-wave voltage, voltage ramp, sine voltage wave.

5. The method as claimed in claim 4, in which the second voltage is of the same amplitude as the first voltage.

6. The method as claimed in claim 1, in which the resultant currents are less than 50% of the maximum current.

7. The method as claimed in claim 1, in which in step b) it is determined which of the currents generated in the stator by the two magnetic fluxes is the weaker and/or the later in relation to the other.

8. The method as claimed in claim 1, in which the north pole of the rotor corresponds to the case in which the current level is lower at the end of a same duration and for a same amplitude of the applied voltage.

9. The method as claimed in claim 1, in which the estimated position of the pole of the rotor in relation to the stator is determined by applying high-frequency signals to the stator and then by analyzing the resultant voltages and high-frequency current in order to deduce therefrom the position of a pole of the rotor.

10. The method as claimed in claim 1, in which a saturable magnetic zone is (i) a magnetic material bridge formed between the seats in the rotor intended to receive the permanent magnets, which are disposed so as to define the poles of the rotor, and/or (ii) a magnetic material bridge disposed between a seat and the air gap of the machine.

11. A device for determining the polarity of a pole of a rotor of an electrical rotating machine having an estimated position relative to a stator, the device comprising:
   a) means for applying an excitation voltage to the stator so as to generate two different magnetic fluxes successively within a saturable magnetic zone of said pole, one flux in conjunction with and the other in opposition to the magnetic flux of magnets of the rotor defining the pole of the rotor, so as to saturate the saturable magnetic zone for at least one of the magnetic fluxes, and b) means for determining the polarity of the pole on the basis of the differences in the temporal evolution of the current generated in the stator by the two magnetic fluxes.

12. A frequency variator for an electric motor, comprising a device for determining polarity as claimed in claim 11.

13. An electrical rotating machine comprising
a motor comprising a rotor having permanent magnets, an a variator according to claim 12, for controlling the motor.

14. The machine as claimed in claim 13, in which the rotor is a flux concentration or synchro-reluctant rotor having permanent magnets.

15. The machine as claimed in claim 13, in which each pole of the rotor comprises at least one saturable magnetic zone.

16. The machine as claimed in claim 13, comprising a stator wound over teeth or having distributed windings.

* * * * *